United States Patent [19]
Fujita et al.

[11] Patent Number: 5,409,555
[45] Date of Patent: Apr. 25, 1995

[54] METHOD OF MANUFACTURING A FORGED MAGNESIUM ALLOY

[75] Inventors: Makoto Fujita, Higashihiroshima; Yukio Yamamoto, Hiroshima; Nobuo Sakate, Hiroshima; Shoji Hirabara, Kure, all of Japan

[73] Assignee: Mazda Motor Corporation, Hiroshima, Japan

[21] Appl. No.: 127,358

[22] Filed: Sep. 28, 1993

[30] Foreign Application Priority Data

Sep. 30, 1992 [JP] Japan .................................. 4-286864
Mar. 9, 1993 [JP] Japan .................................. 5-076163

[51] Int. Cl.6 .......................... C22C 23/00; C22C 1/00
[52] U.S. Cl. .................................... 148/667; 148/406; 148/420; 148/583; 148/666
[58] Field of Search ............... 148/666, 667, 583, 420, 148/406

[56] References Cited

U.S. PATENT DOCUMENTS

| | | | |
|---|---|---|---|
| 2,235,415 | 3/1941 | Altwicker | 148/666 |
| 2,294,648 | 9/1942 | Ansel et al. | 148/666 |
| 2,934,462 | 4/1960 | Barbian et al. | 148/667 |
| 5,087,304 | 2/1992 | Chang et al. | 148/406 |

FOREIGN PATENT DOCUMENTS

| | | | |
|---|---|---|---|
| 59-67102 | 4/1984 | Japan . | |
| 0025550 | 1/1990 | Japan | 148/666 |
| 4-147938 | 5/1992 | Japan . | |

OTHER PUBLICATIONS

Braun et al. Metals Handbook, vol. 4, ASM, 1982, p. 744.

Primary Examiner—Uprendra Roy
Attorney, Agent, or Firm—Fish & Richardson

[57] ABSTRACT

An article of manufacture made of a magnesium alloy is made by casting the magnesium alloy to provide a casting, forging the casting to render material of the casting to have an average crystalline particle size of not greater than 100 μm, and carrying out a T6 treatment (a solution treatment and an artificial aging treatment) with respect to the casting. Physical properties such as, for example, the tensile strength, elongation and the like of the article are considerably improved by virtue of the synergistic effect of the micronized crystalline particles and the T6 treatment.

7 Claims, 17 Drawing Sheets

METHOD OF MANUFACTURING A FORGED MAGNESIUM ALLOY

BACKGROUND OF THE INVENTION

1. Field of the Invention

The present invention relates to an article of manufacture made of a magnesium alloy such as, for example, a wheel or a suspension arm of an automotive vehicle, and also relates to a method of making the same.

2. Description of the Prior Art

Aluminum alloys are generally used for the manufacture of a wheel, a suspension arm, or the like of an automotive vehicle for the purpose of reducing the weight of the automotive vehicle. In recent years, magnesium alloys tend to be used in order to aim at a further reduction in weight. Japanese Laid-open Patent Publication (unexamined) No. 59-67102 discloses a disc wheel which is obtained by casting a molten magnesium alloy under a high pressure to provide a wheel casting and by carrying out a T6 treatment (a solution treatment and an artificial aging treatment) with respect thereto.

In the case of the magnesium alloys, however, the manufacture of the entire wheel only by the casting results in insufficient strength of, for example, a rim portion which carries a tire. Because of this, the problem arises that physical properties of the wheel cannot be sufficiently improved even by the T6 treatment.

On the other hand, the so-called casting and forging is known as a method of making an article of manufacture such as an automotive part or the like, and comprises the steps of: casting a metal alloy to provide a casting (a blank to be forged) of a shape analogous to that of a target product; and forging the casting. For example, in applications where an automotive wheel is manufactured by the casting and forging, a molten alloy 103 is initially poured into a cavity 102 defined in a sand mold 101, as shown in FIG. 30, to provide a forging stock 104 shown in FIG. 31 for finisher-forging. This forging stock 104 is then placed in between and finisher-forged by upper and lower dies 105 and 106, as shown in FIG. 32, thereby providing a forging. Thereafter, the forging is held between a mandrel 107 and a pressure member 108, as shown in FIG. 33, so that only a rim portion may be subjected to spin forging with the use of a roll 109. The finisher forging may be omitted according to circumstances.

As discussed hereinabove, the casting and forging has the advantage of considerably simplifying the required processes as compared with the normal forging in which a billet is used as a stock. Because of this, this method is primarily applied to the manufacture of articles made of an aluminum alloy. This method, however, has little advantages in improving the physical properties of such articles.

More specifically, the aluminum alloys include casting alloys having a high strength, and a specific casting process for increasing the strength such as, for example, liquid metal forging can be applied thereto. Accordingly, it is possible to make high-strength parts of a shape close to that of a target product only by the casting. Furthermore, even if the crystalline particle size of a casting of an aluminum alloy is micronized by forging, remarkable effects cannot be expected in respect of the physical properties.

Japanese Laid-open Patent Publication (unexamined) No. 4-147938 discloses an article of manufacture made of a magnesium alloy and a method of making such an article. According to this disclosure, the so-called sputtering process is applied to the manufacture of a magnesium alloy containing a high-melting metal, for example, tantalum (Ta) or niobium (Nb). By the application of the sputtering process, magnesium together with tantalum or niobium is held as a solid solution of a uniform phase. The magnesium alloy thus obtained is light and superior in resistance to corrosion, resistance to wear, and toughness. However, the problem arises that because each of tantalum and niobium has a high-melting point, the use of the sputtering process is inevitably required, thus complicating the manufacturing method.

SUMMARY OF THE INVENTION

The present invention has been developed to overcome the above-described disadvantages, taking note of the fact that when crystalline particles of an article of manufacture made of a magnesium alloy are micronized by forging, physical properties thereof are remarkably improved.

It is accordingly an object of the present invention to provide an improved method of making an article of manufacture made of a magnesium alloy, which method is capable of considerably improving the physical properties, for example, the tensile strength, elongation and the like, of the article of manufacture.

Another object of the present invention is to provide the method of the above-described type capable of micronizing crystalline particles while avoiding surface oxidation of the article of manufacture.

A further object of the present invention is to provide an article of manufacture made of a magnesium alloy having a superior resistance to corrosion.

In accomplishing the above and other objects, the method according to the present invention comprises the steps of:

casting the magnesium alloy to provide a casting;

forging the casting to render material of the casting to have an average crystalline particle size of not greater than 100 $\mu$m; and carrying out a T6 treatment with respect to the casting.

The physical properties of the article of manufacture can be considerably improved by the synergistic effect of the fine crystalline particles and the T6 treatment.

Preferably, the forging is carried out at a temperature within the range of 300°–420° C., thereby not only micronizing the crystalline particles, but also avoiding the surface oxidation of the article of manufacture.

The method according to the present invention can be applied to the manufacture of an automotive wheel, thereby sufficiently enhancing the strength of a rim portion thereof which carries a tire.

The article of manufacture according to the present invention comprises a surface portion containing 6 to 12 wt% of aluminum and eutectic structures of an intermetallic compound of magnesium and aluminum and an $\alpha$-phase formed in the surface portion during the T6 treatment. During the forging, the material of the article of manufacture is plasticized so as to have an average crystalline particle size of not greater than 200 $\mu$m, with the eutectic structures dispersed in a linked fashion in the surface portion.

According to the present invention, because the casting of a magnesium alloy is rendered to have an average crystalline particle size of not greater than 100 $\mu$m by the forging and is then subjected to the T6 treatment, the physical properties such as the tensile strength, elongation and the like are considerably improved by virtue of the synergistic effect of the micronized crystalline particles and the T6 treatment.

It is conceivable that the reason for this is that when the crystalline particles are micronized so as to have a diameter of not greater than 100 μm, perlite structures (stratified structures of the α-phase and an intermetallic compound) formed on particle-particle boundaries by the T6 treatment are micronized, and the amount of separated perlite structures increases. When the forging temperature falls within the temperature range suited for solution treatment (for example, in the case of hot forging), a solution phenomenon takes place during the forging and, hence, substantially the same effect as that of the T6 treatment can be obtained only by a T5 treatment (artificial aging treatment). Accordingly, the T6 treatment described throughout the specification includes such a case.

Furthermore, the effect of micronizing the crystalline particles by the forging becomes conspicuous at a temperature of not less than 300° C., and the higher the forging temperature is, the greater such an effect is. However, because surface oxidation of the article of manufacture becomes vivid when the forging temperature exceeds 420° C., the preferred forging temperature ranges from 300° C. to 420° C.

The presence of the eutectic structures dispersed in the linked fashion checks the progress of corrosion and, hence, the article of manufacture according to the present invention has a considerably improved resistance to corrosion.

One reason for choosing the aluminum content in the range of 6–12 wt% is that the aluminum content of not less than 6 wt% can maximize the effects of the T6 treatment, and the aluminum content of greater than 12 wt% results in an excessive production of the Mg-Al intermetallic compound, thereby making the article of manufacture brittle. Another reason is that the aluminum content of less than 6 wt% reduces the amount of the separated eutectic structures whereas the aluminum content of greater than 12 wt% reduces ductility of the article of manufacture.

BRIEF DESCRIPTION OF THE DRAWINGS

The above and other objects and features of the present invention will become more apparent from the following description of preferred embodiments thereof with reference to the accompanying drawings, throughout which like parts are designated by like reference numerals, and wherein.

DETAILED DESCRIPTION OF THE PREFERRED EMBODIMENTS

Figure 1:
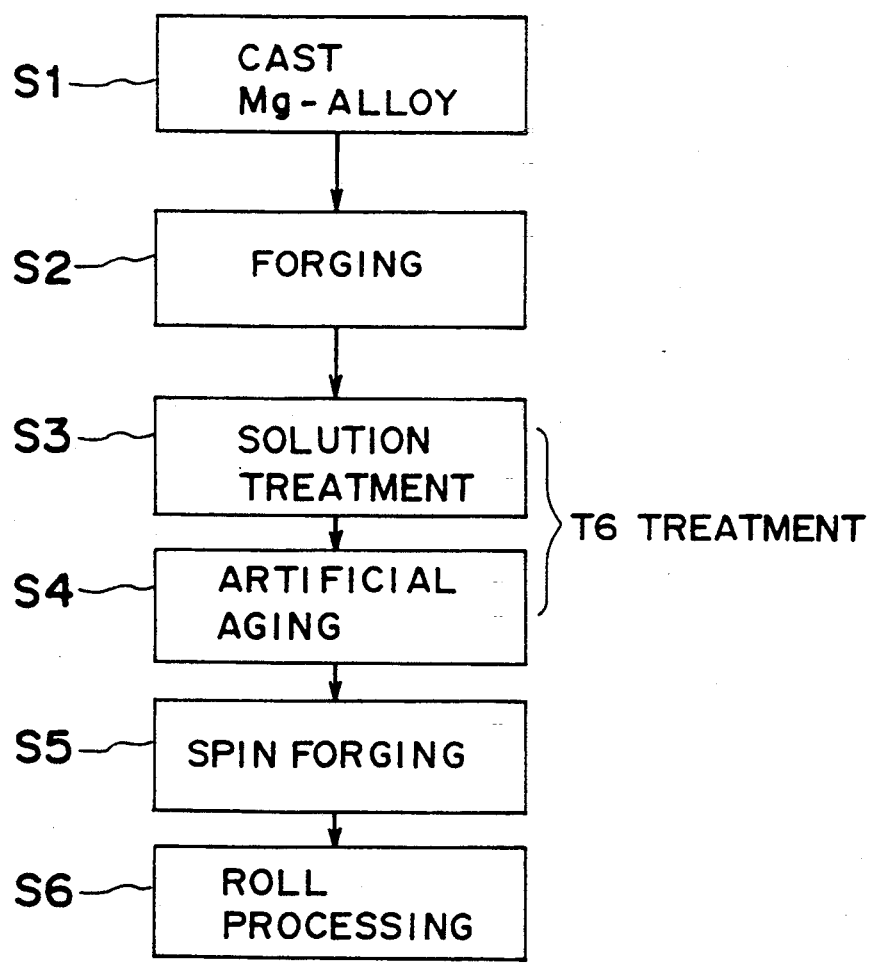
FIG. 1 is a flowchart indicating manufacturing processes of an article of manufacture made of a magnesium alloy according to the present invention.

Referring now to the drawings, there is shown in FIG. 1 a flowchart indicating a manufacturing method according to the present invention.

Figure 2:
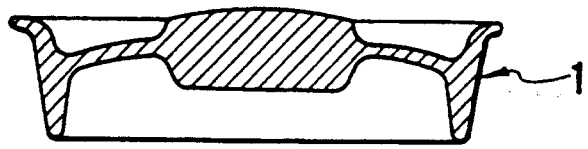
FIG. 2 is a cross-sectional view of a wheel blank to be forged.

At step S1, a casting of a magnesium (Mg) alloy used as material for an article of manufacture, for example, an automobile wheel, is initially prepared. The magnesium alloy referred to above is preferably the one commercially identified by AZ80 (ASTM), the composition of which is shown in Table 1 below. The Mg-alloy casting is prepared by casting the Mg-alloy at a temperature within the range of 690 to 720° C. with a mold assembly heated to 200 to 250° C., and is subsequently forged to provide a wheel blank 1 of a shape substantially identical with that of the eventually manufactured wheel, as shown in FIG. 2.

TABLE 1

| Compo. | Al | Zn | Mn | Si | Fe | Cu | Ni | Mg |
|---|---|---|---|---|---|---|---|---|
| Composi. (wt %) | 8.0 | 0.67 | 0.21 | 0.042 | 0.002 | 0.005 | 0.001 | Bal. |

Figure 3:
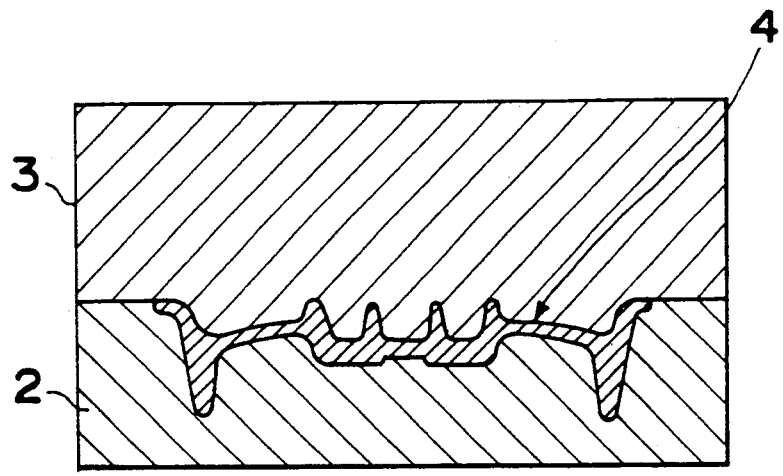
FIG. 3 is a cross-sectional view of the wheel blank during forging.

At step S2, after an appropriate selection of the processing rate, the wheel blank 1 is forged by a forging machine having an upper die 3 and a lower die 2, as shown in FIG. 3. The purpose of this forging is to reduce the average crystalline particle size of the material forming the wheel blank 1 to a value less than 100 $\mu$m where improvement in both of anti-corrosion property (resistance to corrosion) and physical properties is desired, or to a value less than 200 $\mu$m where improvement only in anti-corrosion property is desired.

Forging conditions are so chosen that, during the forging process, the wheel blank 1 is heated at 400° C., or preferably within the range of 300 to 420° C. with both of the dies 2 and 3 heated to 250° C. at a molding speed of 10 mm/sec. After this forging operation, a final product, i.e., an automotive wheel 4 made of the magnesium alloy is obtained.

At step S3, the wheel 4 is subjected to a solution treatment wherein after the wheel 4 has been heated at 400° C. for 8 hours, it is air-cooled. At step S4, the wheel 4 is subjected to an artificial aging treatment wherein after the wheel 4 has been heated at 175° C. for 16 hours, it is air-cooled.

Figure 4:
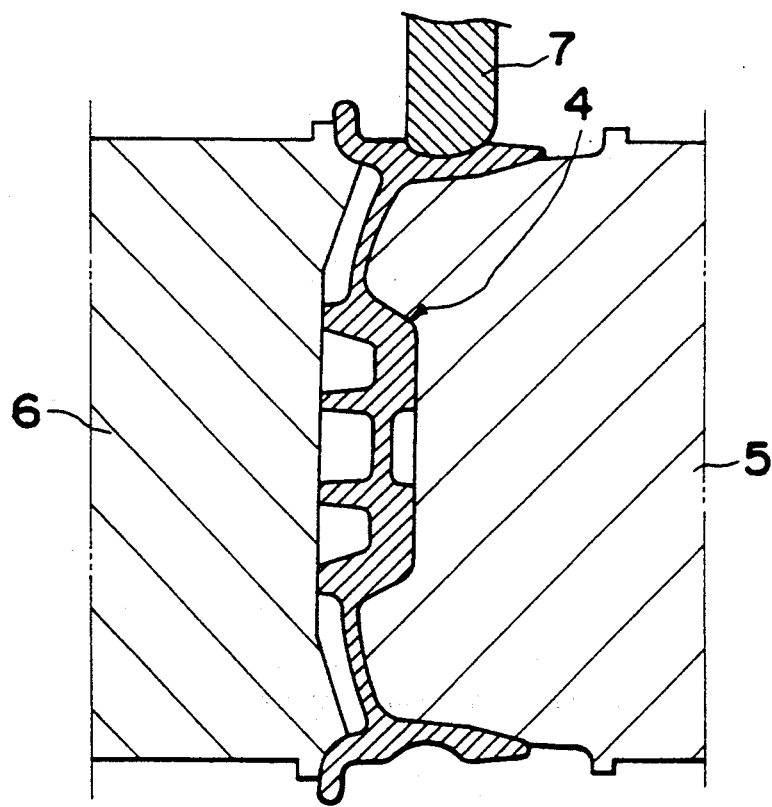
FIG. 4 is a cross-sectional view of a wheel during spin forging.

Upon completion of a T6 treatment including the treatments of steps 3 and 4, spin forging is carried out at step S5. More specifically, as shown in FIG. 4, the wheel 4 is placed in between a mandrel 5 and a pressure member 6, and a roll 7 is pressed against a rim of the wheel 4, while the wheel 4 is being rotated together with the mandrel 5 and the press member 6, so that the rim may be finished by a spinning treatment.

Figure 5:
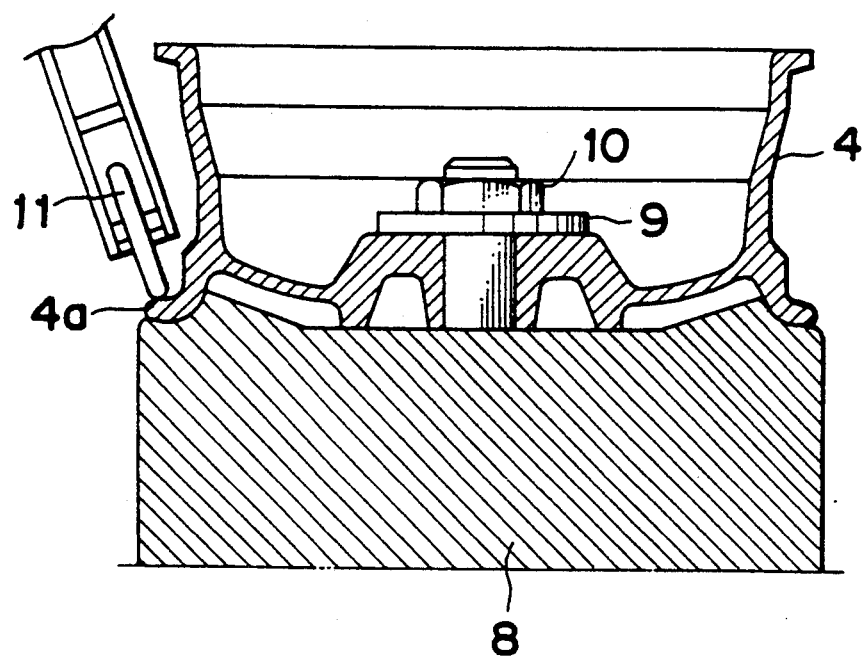
FIG. 5 is a cross-sectional view of the wheel during roll processing.

Upon completion of the spinning treatment, the wheel 4 is fixedly mounted on a rotary platform 8 at step S6 by the use of fixing tools or jigs 9 and 10 with a roll 11 pressed against an edge portion 4a of the rim, as shown in FIG. 5. Under such conditions, while the rotary platform 8 together with the wheel 4 is being rotated, the wheel 4 is subjected to a roll processing, thereby micronizing crystalline particles of the edge portion 4a of the wheel 4. The purpose of this processing is to improve the resistance to corrosion of the edge portion 4a. Because the roll processing can make fine the crystalline particles which tend to become large by the heating and subsequent cooling in the previous processes, the edge portion 4a of the wheel 4, in which water is likely to be trapped when an automotive vehicle having the wheel 4 is in use, can be improved in resistance to corrosion.

The T6 treatment following the forging whereby the wheel blank 1 of the magnesium alloy is configured into the wheel 4 having an average crystalline size of not greater than 100 $\mu$m contributes to considerable improvement of the wheel 4 in physical properties such as, for example, the tensile strength, elongation, and the like by virtue of the synergistic effect of the fine crystalline particles and the T6 treatment.

Furthermore, because the forging temperature is so chosen as to range from 300° C. to 420° C., a reduction in size of the crystalline particles can be achieved while surface oxidation of the wheel 4 of the magnesium alloy is being avoided. Also, because the wheel 4 is made of the magnesium alloy, even the rim thereof for carrying a tire has a sufficient strength.

Figure 6:
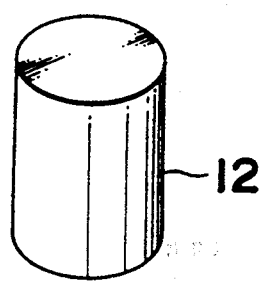
FIG. 6 is a perspective view of a test piece.

Various tests were carried out to examine the effects of the above forging and heat treatments. Initially, a plurality of columnar blanks 12, shown in FIG. 6, having a height of 24 mm and a diameter of 16 mm were prepared from successively molded castings of a magnesium alloy (AZ80). For comparison of the products according to the present invention with those made by the conventional method, swaging (forging) was carried out with respect to the blanks 12 at various swaging rates. Some of the blanks 12 were used directly as test pieces, whereas the remaining blanks 12 were subjected to either a T6 treatment or a T5 treatment before they were used as the test pieces.

Conditions of the T6 treatment mentioned above were as follows.

Solution Treatment

Temperature: 400° C.
Time Period: 8 hours

Artificial Aging Treatment

Temperature: 175° C.
Time Period: 16 hours

Conditions of the T5 treatment mentioned above were as follows.

Artificial Aging Treatment

Temperature: 175° C.
Time Period: 16 hours

Before the swaging (swaging rate: 0 percent), the average crystalline particle size was 260 $\mu$m.

Figure 7:
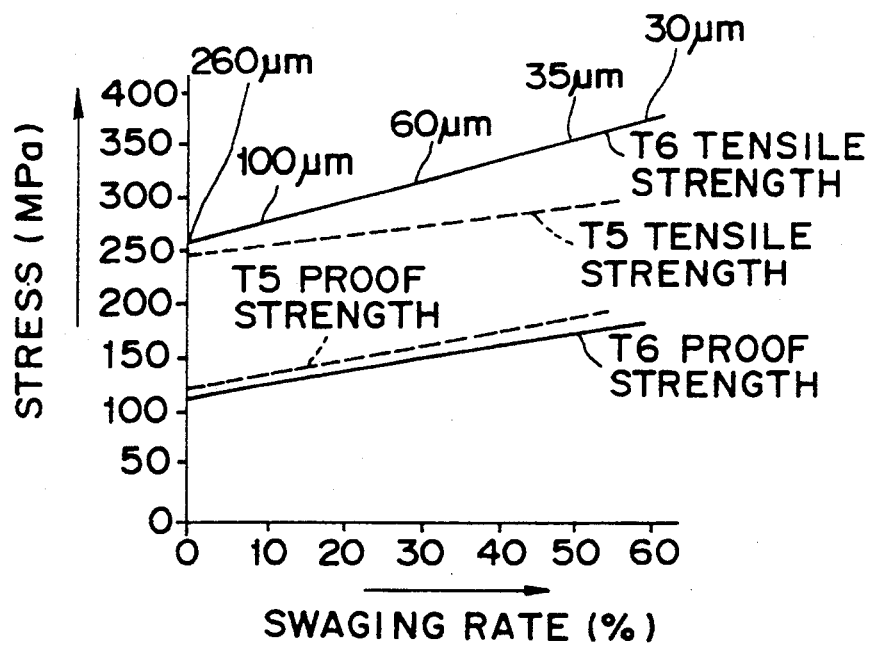
FIG. 7 is a graph indicating stress changes of the test pieces relative to the swaging rate.
Figure 8:
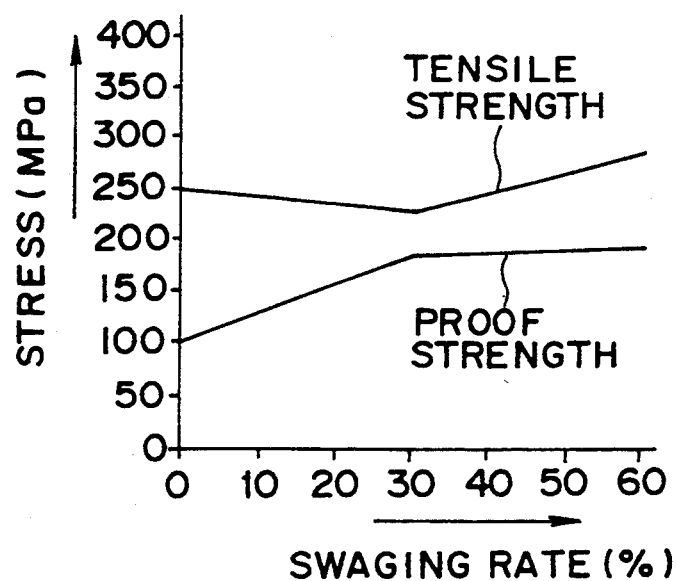
FIG. 8 is a graph indicating stress changes, relative to the swaging rate, of the test pieces made by a conventional method.
Figure 9:
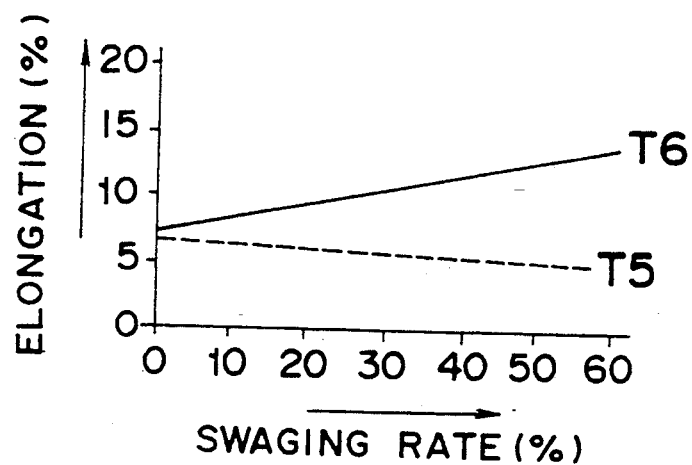
FIG. 9 is a graph indicating elongation changes of the test pieces relative to the swaging rate.
Figure 10:
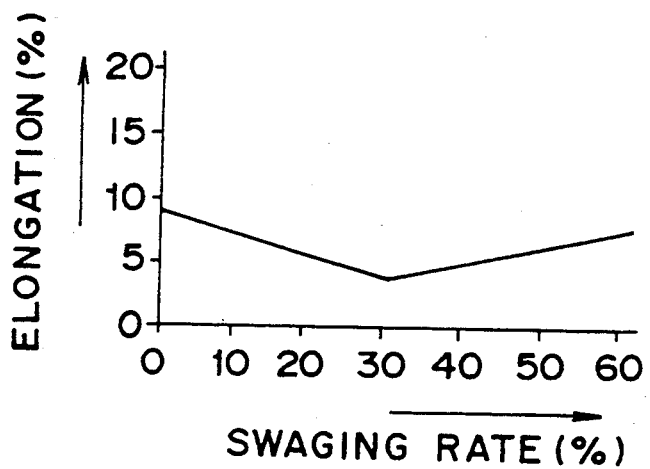
FIG. 10 is a graph indicating an elongation change, relative to the swaging rate, of the test pieces made by the conventional method.
Figure 11:
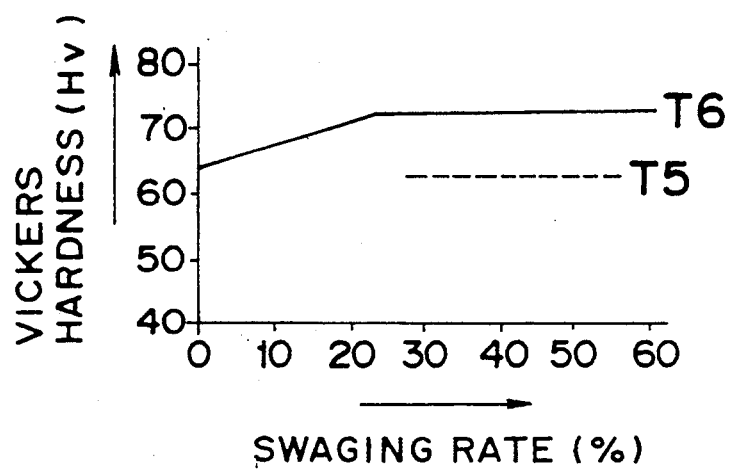
FIG. 11 is a graph indicating hardness changes of the test pieces relative to the swaging rate.
Figure 12:
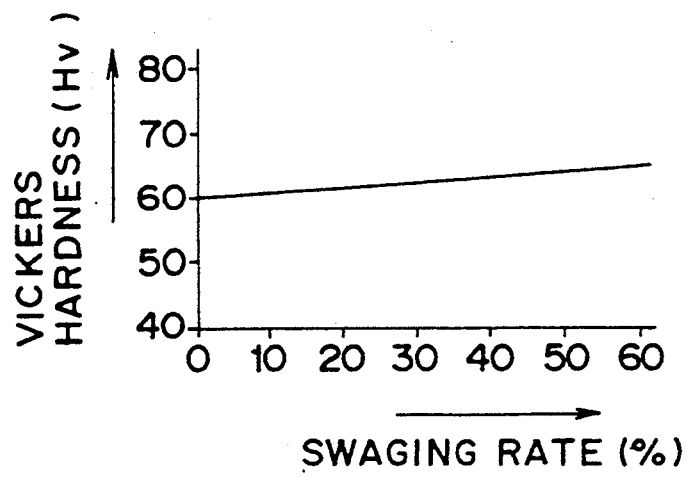
FIG. 12 is a graph indicating a hardness change, relative to the swaging rate, of the test pieces made by the conventional method.

FIGS. 7 to 12 are graphs indicating the results of measurements in which the proof strength, tensile strength, elongation, and Vickers hardness were measured. FIGS. 8, 10, and 12 indicate the results of the test pieces which were subjected to neither the T6 treatment nor the T5 treatment. In FIGS. 7, 9, and 11, dotted lines indicate the results of the test pieces which were subjected to only the T5 treatment, whereas solid lines indicate the results of the test pieces which were subjected to the T6 treatment and are, therefore, substantially identical in structure of metals with the products according to the present invention. The average crystalline particle size of the magnesium alloy identified by AZ80 did not change before and after the T6 treatment.

As shown in FIGS. 8, 10, and 12, the test pieces not subjected to the T6 treatment exhibited no effects of the swaging, and also, as shown by the dotted lines in FIGS. 7, 9, and 11, the test pieces subjected to only the T5 treatment exhibited little definite effects. The solid lines in FIGS. 7, 9, and 11, however, proves that the test pieces subjected to the T6 treatment were improved in physical properties such as tensile strength, elongation, and the like, and that the higher the swaging rate was, i.e., the smaller the average crystalline particle size was, the more the physical properties were improved.

Figure 13:
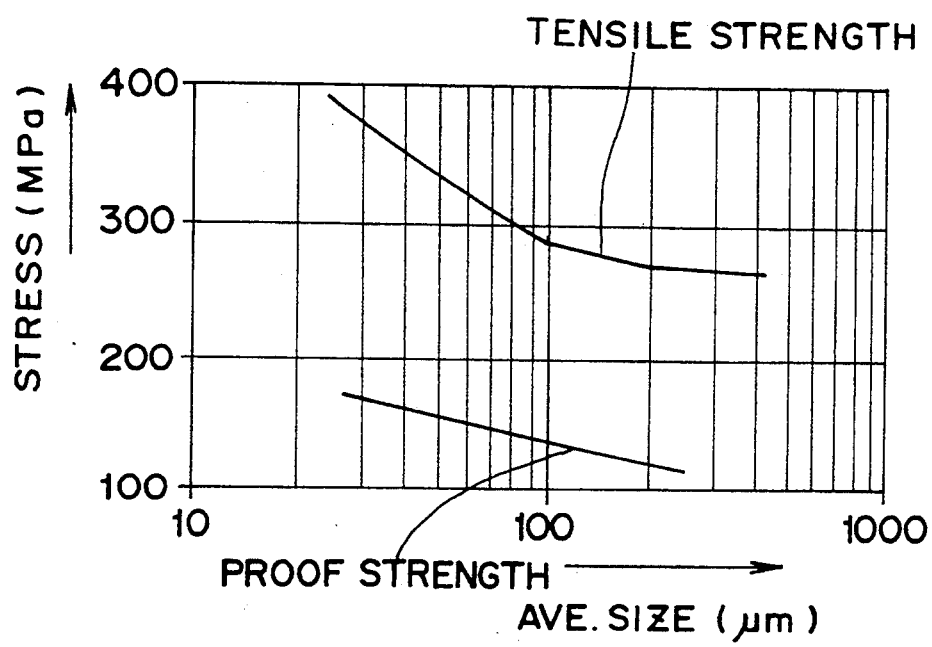
FIG. 13 is a graph indicating stress changes relative to the average crystalline particle size after the T6 treatment.

FIG. 13 is a graph indicating characteristic curves wherein the axis of abscissa represents the average crystalline particle size after the T6 treatment and the axis of ordinate represents the stress (the tensile strength and the proof strength). The graph of FIG. 13 indicates that the tensile strength and the proof strength are considerably improved when the average crystalline particle size after the T6 treatment is not greater than 100 μm.

Figure 14:
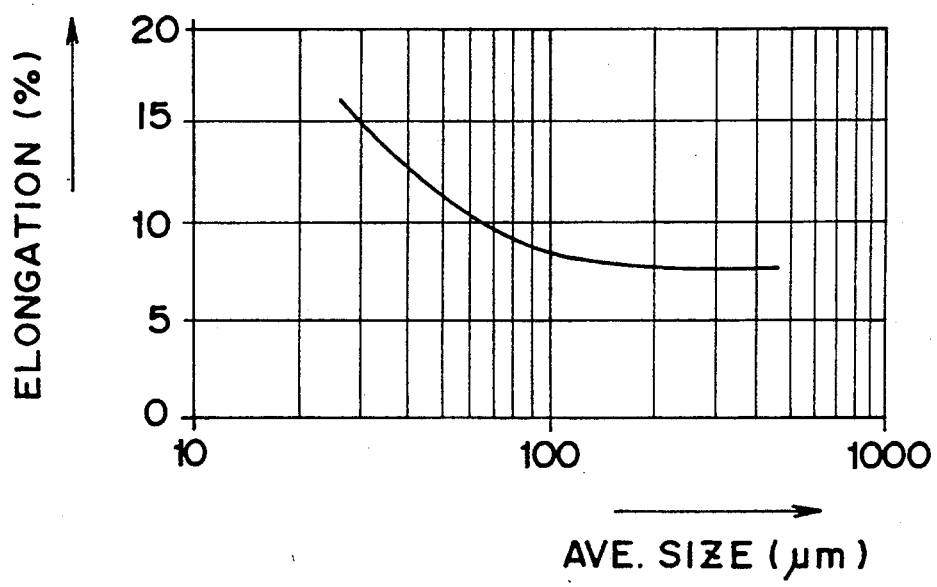
FIG. 14 is a graph indicating an elongation change relative to the average crystalline particle size after the T6 treatment.

FIG. 14 is a graph indicating a characteristic curve wherein the axis of abscissa represents the average crystalline particle size after the T6 treatment and the axis of ordinate represents the elongation. The graph of FIG. 14 indicates that the elongation is considerably improved when the average crystalline particle size after the T6 treatment is not greater than 100 μm.

Figure 15:
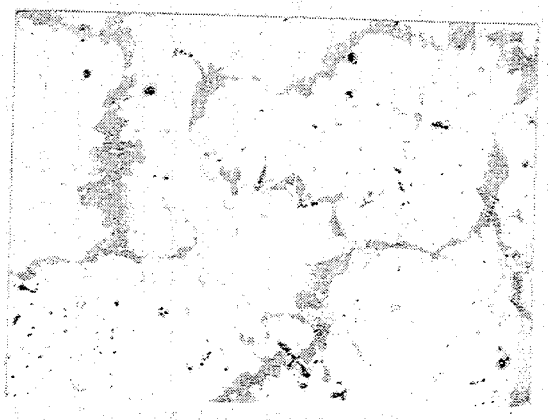
FIG. 15 is a microphotograph indicating the structure of metals obtained at a swaging rate of 0% after the T6 treatment.
Figure 16:
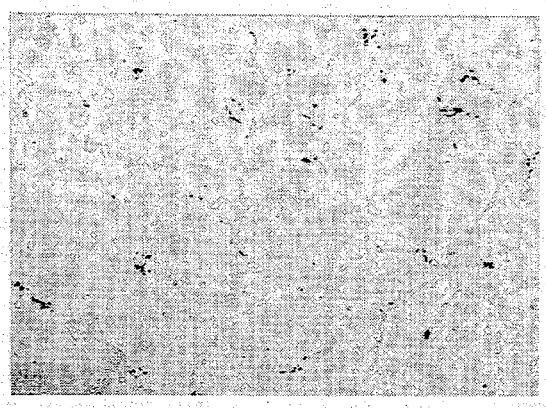
FIG. 16 is a microphotograph similar to FIG. 15, but obtained at a swaging rate of 0% without the T6 treatment.
Figure 17:
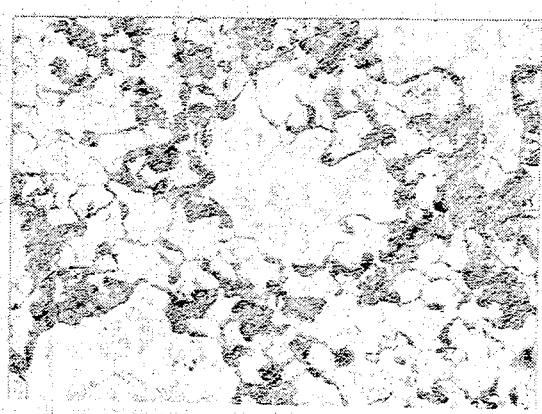
FIG. 17 is a microphotograph similar to FIG. 15, but obtained at a swaging rate of 30% after the T6 treatment.
Figure 18:
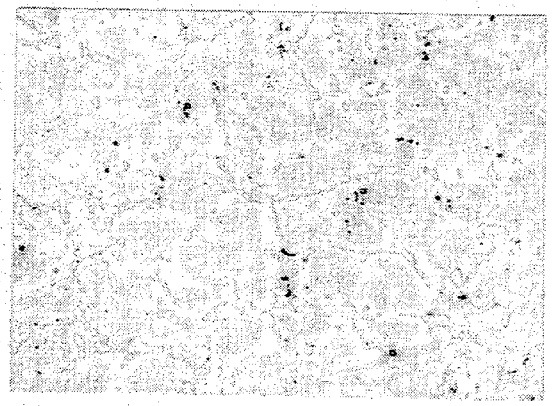
FIG. 18 is a microphotograph similar to FIG. 15, but obtained at a swaging rate of 30% without the T6 treatment.
Figure 19:
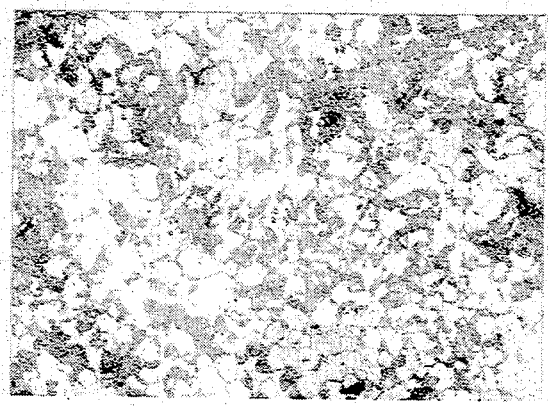
FIG. 19 is a microphotograph similar to FIG. 15, but obtained at a swaging rate of 60% after the T6 treatment.
Figure 20:
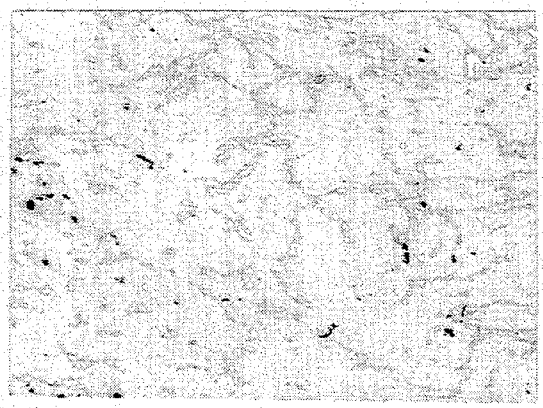
FIG. 20 is a microphotograph similar to FIG. 15, but obtained at a swaging rate of 60% without the T6 treatment.

FIGS. 15 to 20 are microphotographs indicating the structure of metals before and after the T6 treatment. FIG. 15 indicates the structure of metals of a test piece subjected to the T6 treatment at a swaging rate of 0%. FIG. 16 indicates the structure of metals of an as-casted test piece (hereinafter referred to as a material F) subjected to no T6 treatment at a swaging rate of 0%. FIG. 17 indicates the structure of metals of another test piece subjected to the T6 treatment at a swaging rate of 30%. FIG. 18 indicates the structure of metals of an as-forged test piece (hereinafter referred to as a material H) obtained at a swaging rate of 30%. FIG. 19 indicates the structure of metals of another material subjected to the T6 treatment at a swaging rate of 60%. FIG. 20 indicates the structure of metals of the material H obtained at a swaging rate of 60%.

As is clear from FIGS. 15 to 20, it is difficult to observe the crystalline particles of the material F and those of the material H (see FIGS. 16, 18, and 20). However, it appears that the crystalline particles were turned into fine particles after the swaging (see FIGS. 18 and 20), though it is difficult to conclude this based on only the microphotographs. Mg-Al intermetallic compounds separated out on particle-particle boundaries are crushed and are lined with one another in a direction generally perpendicular to the swaging direction (the vertical direction in the figures).

On the other hand, it is possible to clearly observe the crystalline particles of the test pieces subjected to the T6 treatment (see FIGS. 15, 17, and 19). The crystalline particles become fine with an increase in swaging rate, and perlite structures (black portions in the microphotographs) separated out on the particle-particle boundaries are also fine. The amount of the separated perlite structures tends to increase in proportion to the swaging rate. Also, it has become clear that the resistance to corrosion is improved with an increase of the perlite structures.

The relationship between the average crystalline particle size of a forging and the initial average crystalline particle size of a casting (blank to be forged) is discussed hereinafter.

Figure 21:
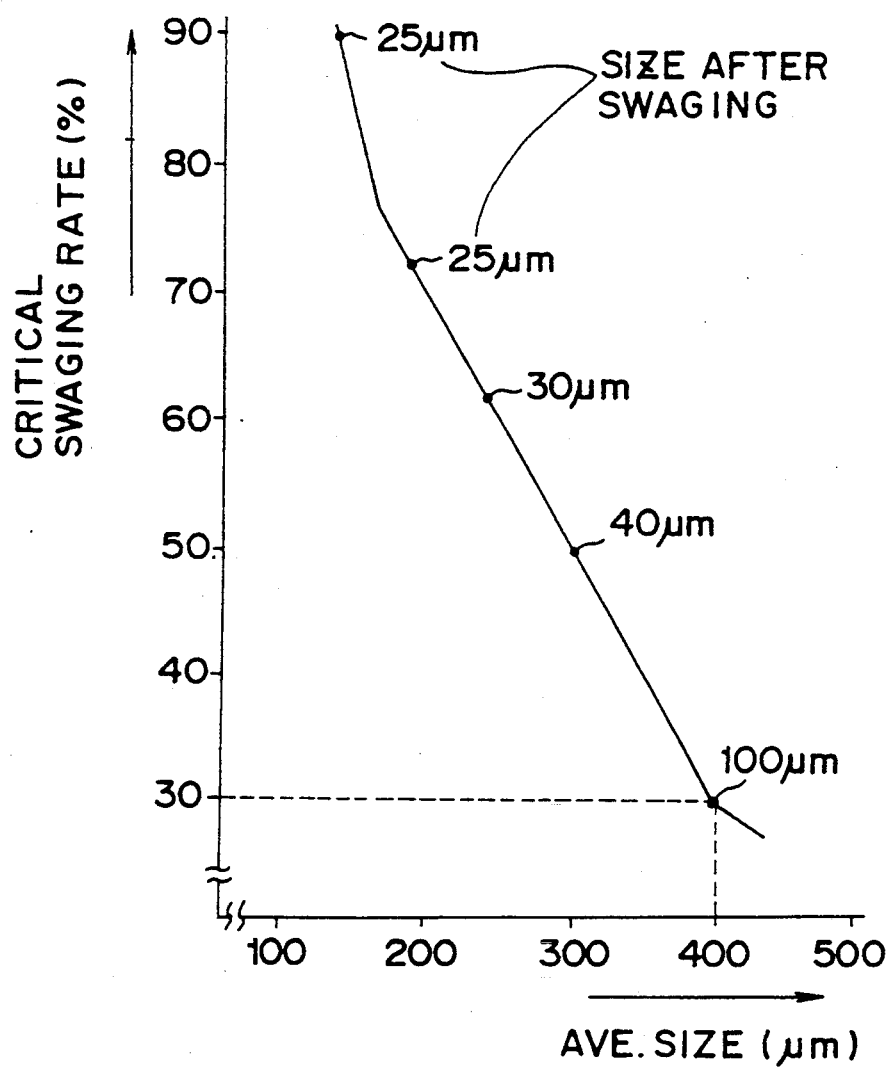
FIG. 21 is a graph indicating a relationship between the average crystalline particle size and the critical swaging rate.

FIG. 21 is a graph obtained from tests wherein swaging was carried out at a forging temperature of 350° C. and indicating a relationship between the initial average crystalline particle size of the Mg-alloy (AZ80) castings and the critical swaging rate. The critical swaging rate means the reduction rate in height of columnar test pieces having, for example, a diameter of 15 mm and a height of 30 mm at the time the presence of fine cracking has been confirmed on the side surface of the test piece with the naked eye during a specific swaging treatment wherein the test piece is subjected to swaging in a direction longitudinally thereof while being placed between upper and lower dies. The higher the critical swaging rate is, the easier a raw material can be forged. This critical swaging rate is given by $$\text{Critical Swaging Rate} = \frac{H - H1}{H} \times 100 \ (\%)$$

where H and H1 indicate the initial height of the test piece and the height of the test piece at the time the fine cracking has been confirmed, respectively.

The graph of FIG. 21 proves that the smaller the initial average crystalline particle size is, the higher the critical swaging rate is and, hence, the easier the forging is. Although the crystalline particle sizes after the swaging are plotted in this graph, when the initial average crystalline particle size is small, no problems are encountered within the range of the critical swaging rate, and this size can be reduced to a size not greater than 100 μm. However, in the case of the test piece having an initial average crystalline particle size of, for example, 400 μm, the critical swaging rate is required to be less than 30% in order to obtain an average crystalline particle size of 100 μm by a single swaging.

When the average crystalline particle size of a casting exceeds 400 μm, a single swaging cannot reduce it to a size of not greater than 100 μm, and a plurality of swaging treatments alternating with annealing treatments are required. However, in order to take full advantage of the benefits of the casting and forging method, it is preferable to obtain a material of an average crystalline particle size of not greater than 100 μm by a single swaging. To this end, it is necessary to set the initial average crystalline particle size of the casting to a value of not greater than 400 μm and the processing rate of the swaging to a value of not less than 30%.

An increase in cooling rate or addition of a micronizing agent is also effective to obtain castings of a small average crystalline particle size.

Figure 22:
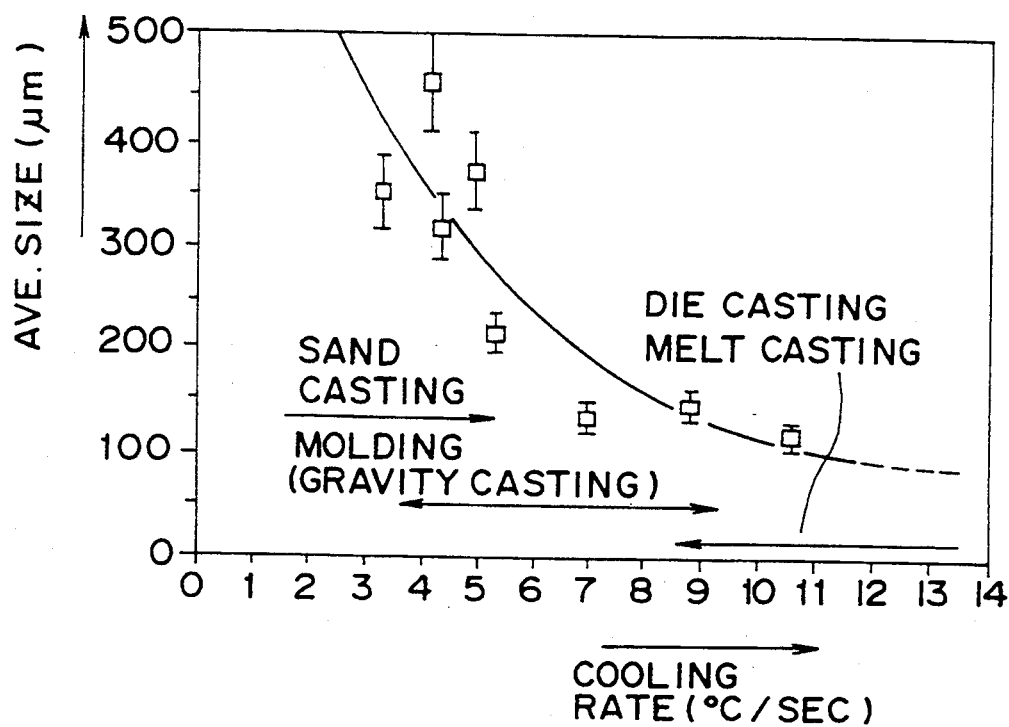
FIG. 22 is a graph indicating a relationship between the average crystalline particle size and the cooling rate of Mg-alloy castings identified by AZ80.
Figure 23:
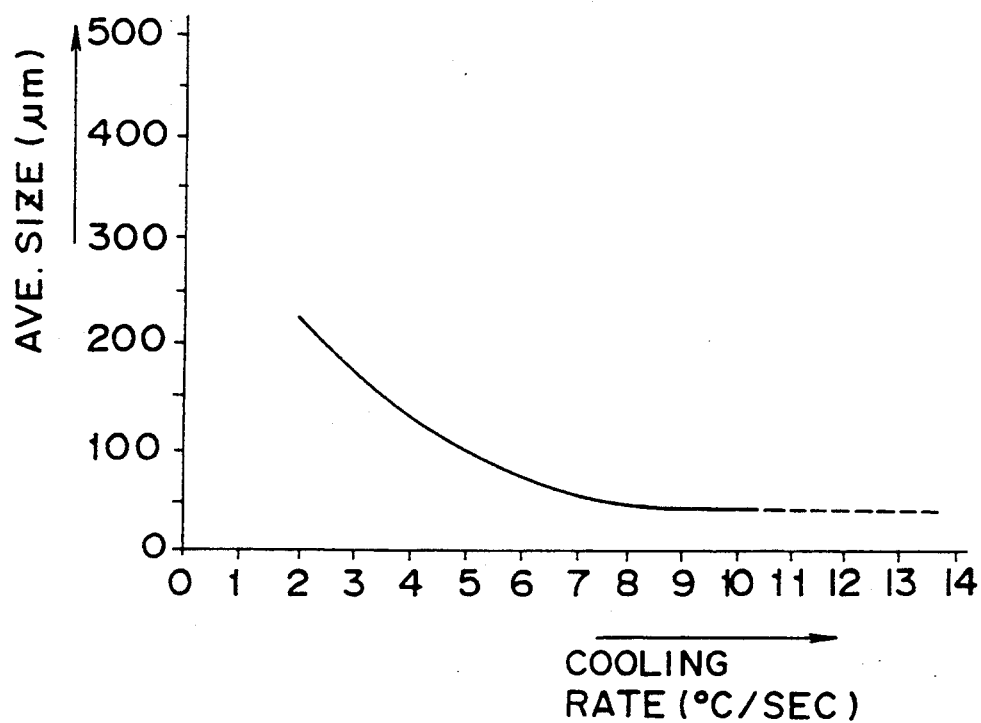
FIG. 23 is a graph indicating a relationship between the average crystalline particle size and the cooling rate at the time micronizing agent is added to the castings.

FIG. 22 is a graph indicating a relationship between the average crystalline particle size of Mg-alloy (AZ80) castings and the cooling rate. FIG. 23 is a graph indicating a relationship between the average crystalline particle size and the cooling rate at the time 0.5% of CaNCN is added as the micronizing agent.

Further tests were carried out with respect to test pieces prepared by the use of a molten Mg-alloy (AZ80) having the composition shown in Table 2 below.

TABLE 2

| Compo. | Al | Zn | Mn | Si | Fe | Cu | Ni | Mg |
|---|---|---|---|---|---|---|---|---|
| Composi. (wt %) | 7.8 | 0.7 | 0.18 | 0.03 | 0.002 | 0.001 | 0.0005 | Bal. |

The molten magnesium alloy was initially casted and subsequently forged so as to be configured into test pieces having an average crystalline particle size of 800

μm and those having an average crystalline particle size of 150 μm. The material of the former can be regarded as being analogous to that of an article made by the conventional method, whereas the material of the latter can be regarded as being analogous to that of the article according to the present invention. All of these test pieces were then subjected to the T6 treatment and a corrosion test.

Figure 24:
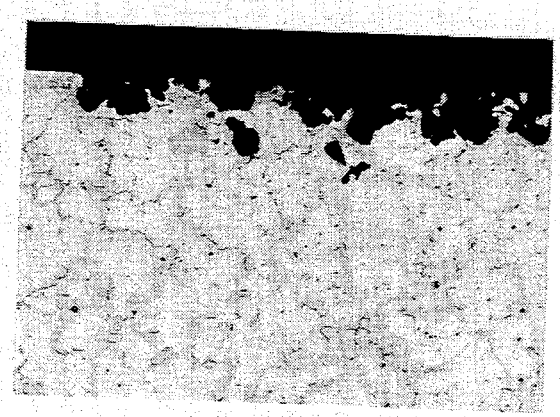
FIG. 24 is a microphotograph indicating the structure of metals of a test piece having an average crystalline particle size of 800 μm.
Figure 25:
FIG. 25 is a microphotograph indicating the structure of metals of a test piece having an average crystalline particle size of 150 μm.

FIGS. 24 and 25 indicate the structure of metals after the corrosion test. FIG. 24 are microphotographs (magnification: 200 times) of the test pieces of the average crystalline particle size of 800 μm, which micrographs were obtained by immersing them in a corrosive liquid containing 10 wt% of nitric acid and 90 wt% of ethanol for about 10 seconds after the T6 treatment. FIG. 25 are microphotographs (magnification: 100 times) of the test pieces of the average crystalline particle size of 150 μm, which micrographs were obtained by immersing them in the aforementioned corrosive liquid for about 60 seconds after the T6 treatment.

As can be known from FIGS. 24 and 25, the test pieces of the magnesium alloy subjected to the T6 treatment after the casting and forging contain eutectic structures (grey portions in the figures) of an intermetallic compound of magnesium and aluminum (Mg17Al12) and the α-phase. However, the test pieces, shown in FIG. 24, of the average crystalline particle size of 800 μm contain the eutectic structures not linked in series, and corrosion progresses from particle-particle boundaries at which the eutectic structures are broken (black portions in the figure). In contrast, because the test pieces, shown in FIG. 25, of the average crystalline particle size of 150 μm contain the eutectic structures linked in series, the eutectic structures check the progress of the corrosion, thereby considerably improving the resistance to corrosion.

Figure 26:
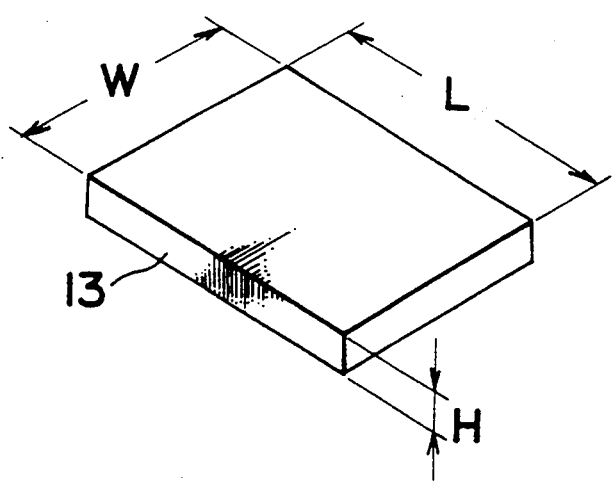
FIG. 26 is a perspective view of a test piece.

Furthermore, using the molten Mg-alloy (AZ80) having the composition shown in Table 2 above, castings for use as blanks were prepared, which were in turn forged into test pieces 13 having a length L of 40 mm, a width W of 30 mm, and a height H of 5 mm, as shown in FIG. 26. Swaging at different rates rendered the test pieces 13 to have different average crystalline particle size of 400 μm (D), 300 μm (C), 200 μm (B), and 100 μm (A). These test pieces were then heated at a temperature of 400° C. for 5 hours in a solution treatment and were cooled in a subsequent artificial aging treatment. Thereafter, the test pieces were subjected to a corrosion test wherein salt water was sprayed thereto. Conditions of the corrosion test were as follows.

Test Temperature: 35° C.
Time Period: 240 hours
Concentration of Salt Water: 5 wt%.

Figure 27:
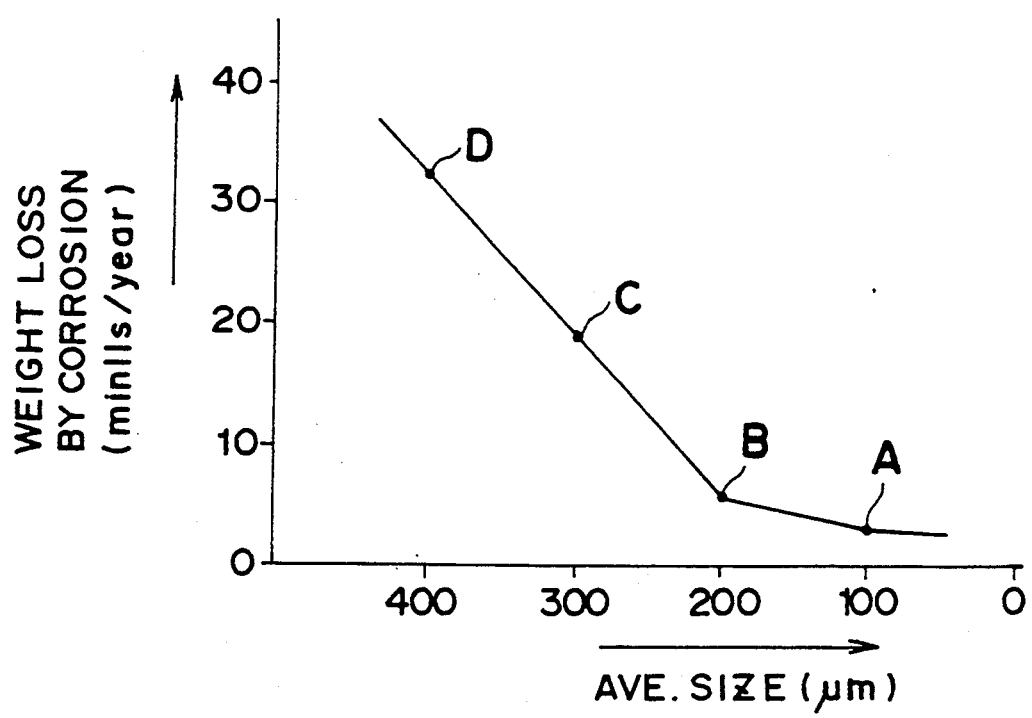
FIG. 27 is a graph indicating a relationship between the loss in weight of the test pieces and the average crystalline particle size.

FIG. 27 indicates the results of the corrosion test.

As is clear from FIG. 27, the test pieces A and B, which can be regarded as the test pieces according to the present invention, exhibits a superior resistance to corrosion as compared with the test pieces C and D because the loss in weight of the former by the corrosion is considerably reduced.

As discussed hereinabove with reference to FIG. 25, when the average crystalline particle size is not greater than 200 μm, the eutectic structures of the intermetallic compound of magnesium and aluminum (Mg17Al12) and the α-phase are dispersed in a linked fashion, and the linked eutectic structures check the progress of the corrosion.

It is to be noted that in FIG. 27, the unit "mills" means one thousandth (1/1000) of one inch and the unit "mills/year" is a value indicating the loss in weight per one year caused by the corrosion.

Figure 28:
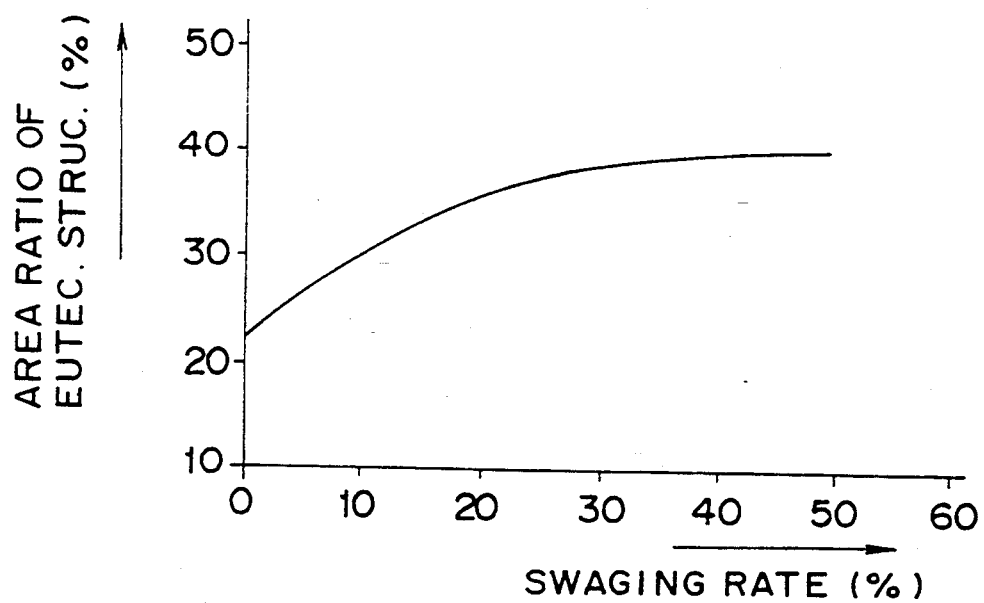
FIG. 28 is a graph indicating a relationship between the area ratio of eutectic structures and the swaging rate.

FIG. 28 is a graph indicating the area ratio of the eutectic structures relative to the swaging rate. As can be known from this graph, the greater the swaging rate is, the larger the area ratio of the eutectic structures is. The initial average crystalline particle size (the size at the time the swaging rate is 0%) was rendered to be 300 μm in obtaining the characteristic of FIG. 28.

Figure 29:
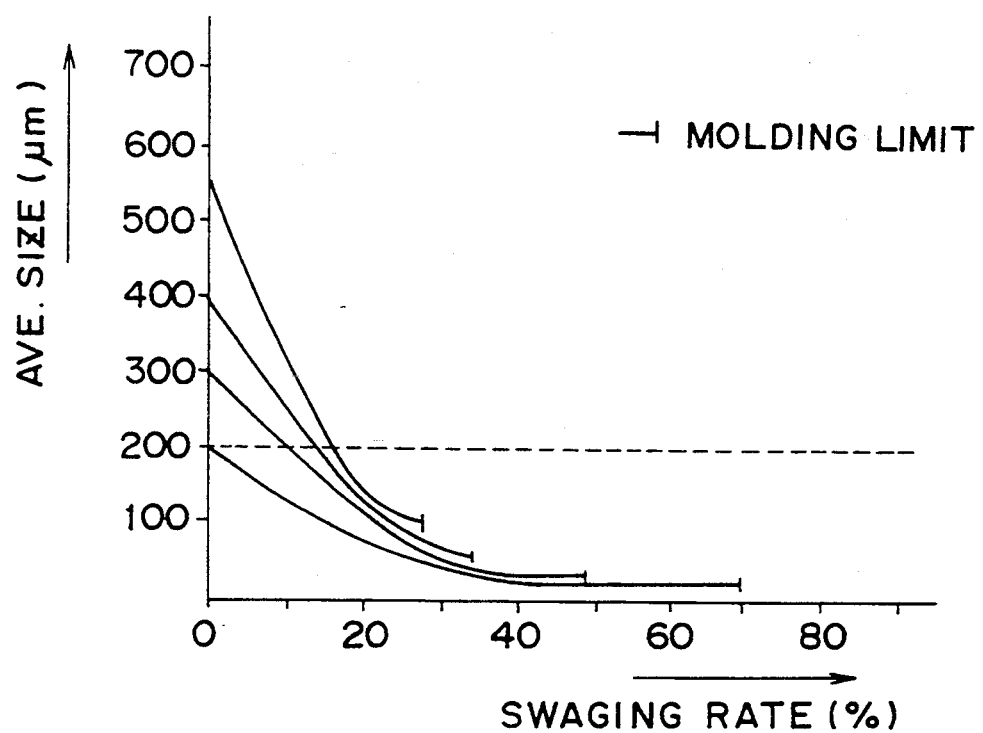
FIG. 29 is a graph indicating relationships between the average crystalline particle size after the swaging and the swagging rate where the initial average crystalline particle size was changed.
Figure 30:
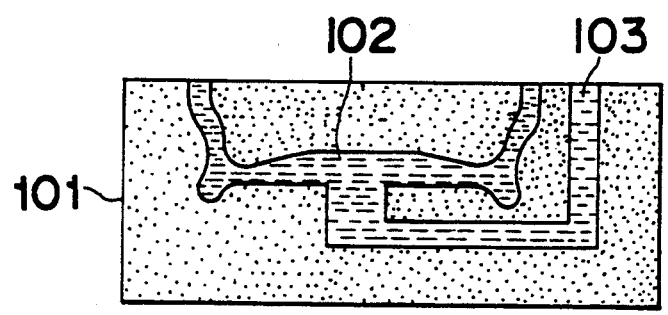
FIG. 30 is a cross-sectional view of a sand mold employed in conventional method.
Figure 31:
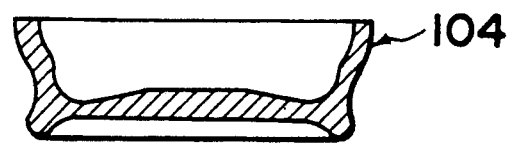
FIG. 31 is a cross-sectional view of a forging stock obtained by pouring a molten alloy into a cavity of the sand mold of FIG. 30.
Figure 32:
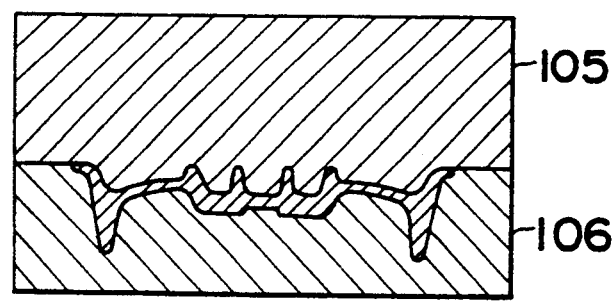
FIG. 32 is a cross-sectional view of a conventional wheel during forging.
Figure 33:
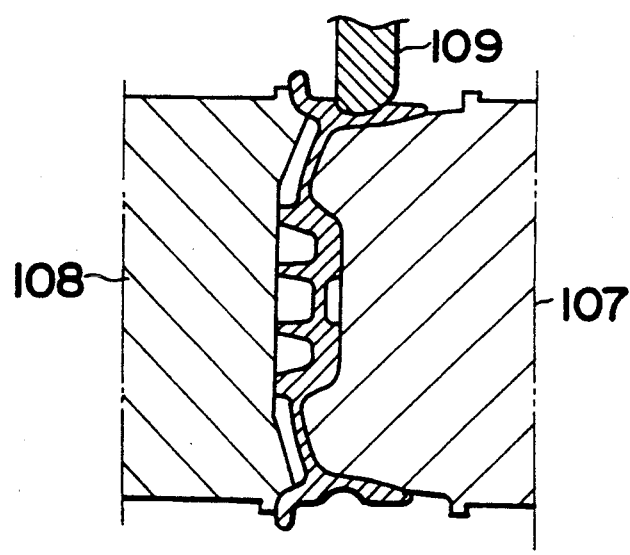
FIG. 33 is a cross-sectional view of the conventional wheel during spin forging.

FIG. 29 is a graph indicating relationships between the average crystalline particle size after the swaging and the swaging rate where the initial average crystalline size was changed. For example, when the initial average crystalline particle size is 300 μm, a swaging rate of about 10% can render the average crystalline particle size to be about 200 μm after the swaging.

As is clear from the above, at least a surface portion of an article of manufacture made of a magnesium alloy which has been subjected to the T6 treatment after the casting and forging contains aluminum in the range of 6–12% by weight (the magnesium alloy shown in Table 2 contains 7.8 wt% of aluminum). The T6 treatment renders the magnesium alloy to contain the eutectic structures of the intermetallic compound of magnesium and aluminum (Mg17Al12) and the α-phase. During the forging, the article is plasticized so as to have the average crystalline particle size not greater than 200 μm with the eutectic structures dispersed in a linked fashion, thereby checking the progress of the corrosion. The article according to the present invention, therefore, has a considerably improved resistance to corrosion.

Furthermore, the article can be made in a simplified manner, i.e., by the T6 treatment after the casting and forging without using the relatively complicated sputtering process which has hitherto been employed.

One reason for rendering the aluminum content to be in the range of 6–12 wt% is that when the aluminum content is not less than 6 wt%, the effects of the T6 treatment are maximized, and when the aluminum content exceeds 12 wt%, the Mg-Al intermetallic compound is excessively produced to thereby make the article brittle. Another reason is that the aluminum content of less than 6 wt% reduces the amount of the separated eutectic structures whereas the aluminum content of greater than 12 wt% reduces ductility of the article.

In order to increase the amount of aluminum in at least the surface portion of the article, an aluminum diffusion treatment may be carried out along with the T6 treatment, thereby increasing not only the aluminum content, but the amount of the separated eutectic structures.

It is to be noted here that in the above-described embodiments, although the automotive wheel is employed as the article of manufacture of the magnesium alloy, the present invention is applicable to the manufacture of a suspension arm, for example an upper suspension arm, or any other suitable members.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A method of making an article of manufacture made of a magnesium alloy, comprising the steps of:
   casting the magnesium alloy to provide a casting;
   forging the casting to render material of the casting to have an average crystalline particle size of not greater than 100 μm; and
   carrying out a T6 treatment with respect to the casting, said T6 treatment including a solution treatment and an artificial aging treatment.

2. The method according to claim 1, wherein said article of manufacture is an automotive wheel.

3. The method according to claim 1, wherein the forging is carried out at a temperature within the range of 300°–420° C.

4. The method according to claim 1, further comprising, after the step of casting, the step of cooling the casting to render material of the casting to have an average crystalline particle size of not greater than 400 μm.

5. The method according to claim 1, wherein said magnesium alloy contains 6 to 12 wt% of aluminum.

6. The method according to claim 3, wherein said article of manufacture is an automotive wheel.

7. The method according to claim 4, wherein said magnesium alloy contains 6 to 12 wt% of aluminum.

* * * * *